Jan. 22, 1929.
W. S. CLARK
1,699,877
MOTOR VEHICLE
Filed Sept. 13, 1926
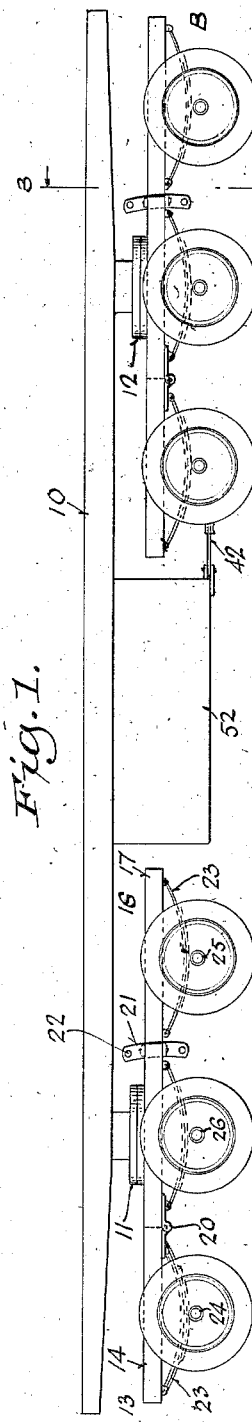
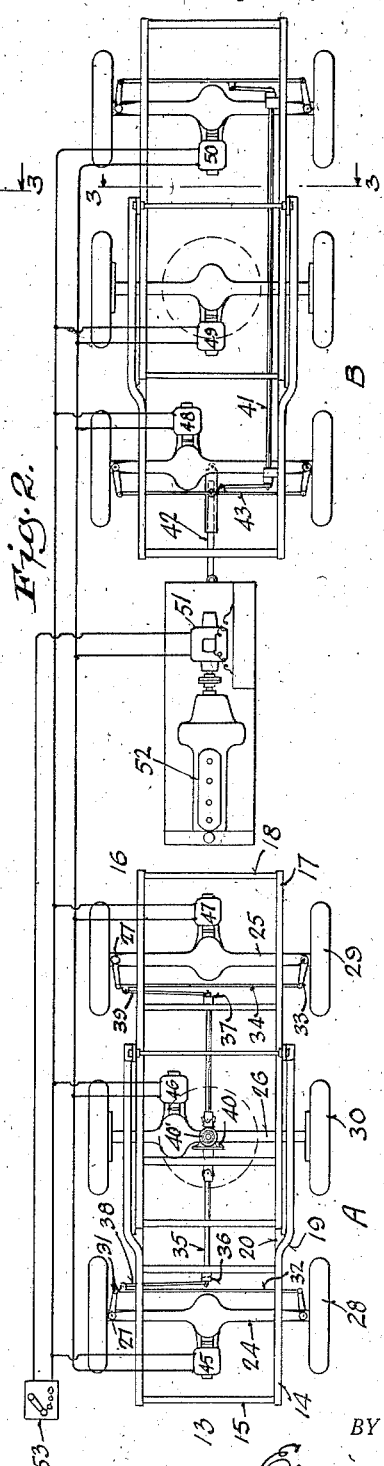
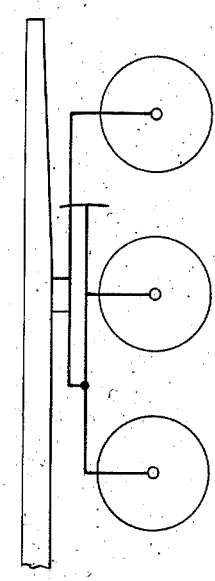
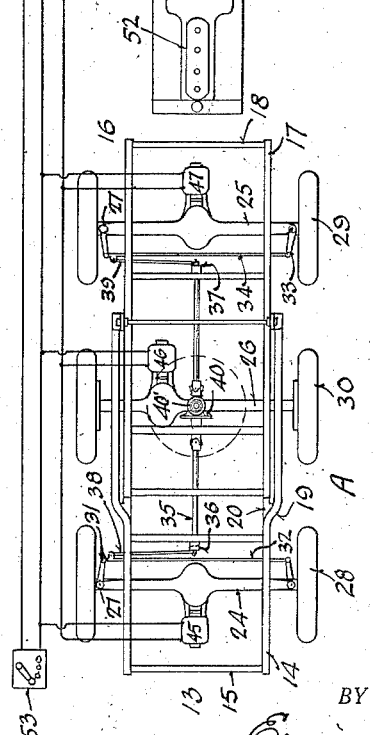
INVENTOR.
WORDEN S. CLARK
BY
Erwin, Wheeler & Woolard
ATTORNEYS Patented Jan. 22, 1929.

1,699,877

UNITED STATES PATENT OFFICE.

WORDEN S. CLARK, OF MILWAUKEE, WISCONSIN.

MOTOR VEHICLE.

Application filed September 13, 1926. Serial No. 135,257.

The invention relates to an improved running gear for motor vehicles, and while primarily designed for use in connection with high-speed busses for the transportation of passengers in highway travel, the features of the invention are such that it is capable of extension to general use in transportation.

The invention resides in an improved body supporting frame comprising a main frame and two sub-frames, located near the respective ends of the main frame, such sub-frames being carried upon a plurality of pairs of driving wheels, the axle of each pair of driving wheels being equipped with an independent driving motor, the arrangement constituting a multiple-unit control.

The sub-frames at each end of the car are divided into two sections, and are pivoted transversely on a horizontal line so that such sections have capacity for vertical movement independently of each other, to facilitate the movement of the wheels over uneven road surfaces, and so reduce the shocks transmitted to the body of the vehicle. Guides are provided to restrain the sections of the sub-frames from lateral displacement and preserve their longitudinal alignment during the relative vertical movements of the sub-frames with relation to each other.

In the form of the invention shown, the truck under each sub-frame is composed of three pairs of driving wheels, the wheels of the fore and aft pairs being pivoted to their axles in the vertical plane of the tread of the wheels, to permit their lateral turning for steering purposes, while the wheels of the intermediate axle follow a fixed path. The distribution of road pressure by the large number of wheels employed lessens the destructive action upon the road surface, and at the same time greatly increases the traction.

In steering, the wheels of the fore pair are turned in one direction, while the wheels of the aft pair are turned in the contrary direction, the truck at such time pivoting on the wheels of the intermediate pair, and following the line of movement indicated by the fore pair. The steering movement of the wheels of the front truck is at the direction of the operator of the vehicle, while the steering movement of the wheels of the rear truck is automatic, and immediately responsive to that of the front truck.

A power plant comprising preferably an internal combustion engine, is supported at the underside of the main frame, and is adapted to directly drive a generator associated therewith, for the production of current for operating the several motors employed. The several motors are connected for synchronous operation, and may readily be brought up to speed.

Having thus outlined the nature and purposes of my invention, I will now describe the structural features more particularly, and in the appended claims will point out the novelty residing in the invention.

In the accompanying drawings:

Figure 1 is a view in left side elevation of the running gear of a motor vehicle constructed in accordance with my invention.

Fig. 2 is a plan view thereof, with the main frame omitted for the sake of clearness of illustration.

Fig. 3 is a transverse vertical, sectional view on the line 3—3, Figs. 1 and 2.

Fig. 4 is a diagram showing the manner of connecting the main frame and sub-frames, and the pivoted connections of the latter.

In the drawing, the numeral 10 indicates the main frame upon which the body of the vehicle is mounted. The said frame is supported upon a front truck and a rear truck, arranged near the respective ends of the main frame. The connection between the main frame and the trucks is effected through fifth-wheels 11 and 12.

Each truck comprises a sub-frame, indicated A at the front, and B at the rear, both such sub-frames and their associated elements being generally of such like construction, that a description of one will suffice for both. Each of the sub-frames is comprised of a front section 13, comprising side bars 14 tied together by suitable cross bars 15, and a rear section 16, likewise composed of side bars 17 and tying cross bars 18, the elements of each section of the sub-frame being constructed to form a rigid structure. The side bars 14 are laterally offset with relation to each other at a point 19 near their mid-length, but otherwise extend in parallelism. In this manner, a space is provided in the rear end of the front section for the entry of the forward end of the rear section, and which permits the side bars 17 of the rear section to be brought in longitudinal alignment, with the narrower formation of the side bars 14 at the front of the front section, as in Fig. 2, to permit and so enable a uniform arrangement to be made of the springs which support the slung or spring-sustained weight of the vehicle, disposed as will later be described.

The forward end of the rear section 16 is connected to the front section 13 by a pivoted joint 20, near the offsetting point 19 of the section 13, so that such sections will be free for independent vertical movement. To prevent disturbance of the longitudinal and vertical alignment of the side bars 14 and 17, the rear ends of the side bars 14 are provided with widened bearing surfaces in the form of attached guides 21, elongated vertically, and tied together by transversely extending rods 22. In the relative vertical movements of the sub-frame sections, the side bars 17 will ride over the opposed surfaces of the guides 21, and the tendency to lateral movement of the sections with respect to each other will be restrained and their alignment preserved.

Fig. 4 shows diagrammatically the manner in which the main frame is mounted upon the truck, and how the two sections of the latter are connected so as to reduce the shocks due to road obstructions. The pivoted point 20 of the forward end of the rear section with the front section, is made at a point about mid-length of the latter, so that any vibration of one of the wheels when an obstruction is encountered, is reduced to approximately one-sixth in its effect upon the main frame.

Springs 23, preferably semi-elliptical, are attached at their ends to the underside of the side bars of the sub-frame, two springs 23 to each side bar 14, and one to the side bar 17, and rest intermediately upon the axles 24, 25 and 26, to which they are properly shackled. The fore axle 24 and the aft axle 25, carry at their ends pivoted stub axles 27, upon which the pairs of driving wheels 28 and 29 are mounted to rotate, so that the fore and aft wheels may turn vertically upon their treads. The driving wheels 30 of the intermediate pair are mounted to rotate in fixed relation upon the ends of the intermediate axle 26 and have no other movement.

The stub axles upon which the fore wheels 28 rotate, are provided with rearwardly extending radial arms 31, connected at their free ends by a link 32, and the stub axles of the aft wheels 29 are provided with like forwardly extending arms 33, connected at their free ends by a link 34. A longitudinally arranged rock shaft 35 is journalled at its ends in bearing in the cross bars of the sub-frame sections 13 and 16, and is provided at its ends with radial arms 36 and 37, which latter are connected by links 38 and 39 to the links 32 and 34, respectively, so that by partial rotation of the rock shaft 35, the fore wheels 28 are turned in one direction, and the aft wheels 29 in the opposite direction, to effect a steering movement of the vehicle from its straight line course, or restoring it to such course.

The rock shaft 35 is formed in three sections, with their adjacent ends connected by universal joints, the intermediate section being geared as at 40, to the steering post 40', the latter being under the control of the operator. In such steering movement, the front truck pivots on the intermediate wheels 30, and follows the course indicated by the fore wheels 28.

In the rear truck, an arrangement somewhat similar to that described is provided for effecting swinging movements of the fore and aft pairs of wheels, the latter being actuated by radial arms on the stub axles, and connected by links, as before. The rock shaft 41 forming part of this construction, is journaled at its ends in bearings in the side bars of the sub-frame sections at one side of the latter. A longitudinally disposed telescoping pole or lever 42, is pivoted at its rear end to the fore axle of the rear truck, and attached at its front end at a point which is fixed in its relation to the main frame. Intermediate its ends, but near its rear end, the pole 42 is connected to the link 43, connecting the radial arms of the front stub axles, so that as the main frame and body of the vehicle turn to one side in response to the steering action of the front truck, the fore wheels of the rear truck follow with a like movement, which is wholly automatic. The contrary movement of the aft wheels of the rear truck follows, the truck pivoting on the intermediate wheels, as before described.

Each pair of wheels is provided with an independent driving motor 45, 46, 47, 48, 49 and 50, arranged in parallel, and supported in proper position upon the respective axles, and geared to the axle so as to drive the same through the usual differential arranged in the axle housing. The motors are energized by the generator 51, mounted under the main frame 10, about the mid-length of the latter. Associated with the generator is a power plant 52, which preferably is in the form of an internal combustion engine. The location of the power plant and generator at the point indicated effect a low center of gravity for the car structure, and add greatly to stabilization of its movements. A controller 53, in the main circuit, enables the operator of the vehicle to regulate the speed.

The particular manner of supporting the main frame upon the trucks, as before stated, is very advantageous, and results in absorbing practically the entire road shock. The connection of the rear section of the sub-frame at a line mid-way between the pairs of wheels of the front section of the sub-frame, and the support of the main frame on the rear section of the sub-frame at a point near the end of the first third of its length, and approximately in the line of the intermediate axle, as shown in Fig. 4, reduces the vibration of the body carried by the main frame to a minimum.

Having thus described my invention, what I claim and desire to secure by Letters Patent of the United States, is:

1. In a motor vehicle, a main frame, and a sub-frame at each end thereof, each sub-frame being provided with three pairs of driving wheels, the fore and aft pairs of which are mounted so as to turn in opposite directions about the intermediate pair in steering the vehicle, means under control of the operator to turn the wheels as described of the front sub-frame, and connections to effect a like movement of the wheels of the rear sub-frame and means associated with the sub-frames for driving wheels thereof 2. In a motor vehicle, a main frame, and a sub-frame at each end thereof, each sub-frame being provided with a plurality of pairs of wheels, with means under control of the operator to turn some of the wheels of the front sub-frame in steering the vehicle, and connections for effecting a corresponding turning movement of some of the wheels of the rear sub-frame and means associated with the sub-frame for driving wheels thereof.

3. In a motor vehicle, a main frame, and a sub-frame at each end thereof, each sub-frame being provided with a plurality of pairs of driving wheels, the fore and aft pairs of which are adapted to be turned in opposite directions about intermediate wheels to effect steering of the vehicle, means under control of the operator to turn the wheels of the front sub-frame as described, connections for effecting a corresponding turning of the fore and aft pairs of wheels of the rear sub-frame, a motor for each pair of driving wheels, and a power plant for energizing the motors.

4. In a motor vehicle, a main frame, and a sub-frame, at each end thereof, such sub-frames being composed of two sections pivoted one to the other to permit independent vertical movement, means for maintaining the said sections in longitudinal and vertical alignment, each such sub-frame being provided with a plurality of pairs of driving wheels, the fore and aft pairs of which are adapted to be turned in opposite directions in steering the vehicle, and means connecting such pairs of wheels to effect such turning.

5. In a motor vehicle, a main frame, and a sub-frame at each end thereof, each such sub-frame being composed of two sections comprising side bars and cross bars, two pairs of fore and intermediate wheels supporting the front section, and one pair of aft wheels supporting the rear section, and such rear section being pivoted at its front end to the front section in a line intermediate the axles of the pairs of fore and intermediate wheels, with the main frame supported on the rear section of the sub-frame at a point approximately over the intermediate axle and approximately one-third from its pivoted end in the direction of its length, to minimize the shocks transmitted to the main frame by road obstructions.

In testimony whereof, I have signed my name at Milwaukee, this 20th day of August, 1926.

W. S. CLARK.